(12) United States Patent
Lin

(10) Patent No.: US 7,437,806 B2
(45) Date of Patent: Oct. 21, 2008

(54) SAFETY HOOK

(75) Inventor: Yu-Wen Lin, Taipei (TW)

(73) Assignee: Usang Industrial Co., Ltd. (TW)

( * ) Notice: Subject to any disclaimer, the term of this patent is extended or adjusted under 35 U.S.C. 154(b) by 0 days.

(21) Appl. No.: 11/672,725

(22) Filed: Feb. 8, 2007

(65) Prior Publication Data

US 2008/0104809 A1    May 8, 2008

(30) Foreign Application Priority Data

Nov. 3, 2006    (TW) ............................... 95219434 U

(51) Int. Cl.
*F16B 45/02* (2006.01)
(52) U.S. Cl. ..................... 24/599.5; 24/600.1
(58) Field of Classification Search ............... 24/599.5, 24/600.1; 294/82.2
See application file for complete search history.

(56) References Cited

U.S. PATENT DOCUMENTS 6,718,601 B1 * 4/2004 Choate ...................... 24/600.2

FOREIGN PATENT DOCUMENTS

FR    2805577 A1 *    8/2001
JP    2006043117 A *    2/2006

* cited by examiner

*Primary Examiner*—James R Brittain
(74) *Attorney, Agent, or Firm*—Sheridan Ross P.C.

(57) ABSTRACT

A safety hook includes: a hook body having a base segment that has front and rear end portions, the rear end portion being formed with an elongate groove that is defined by a groove-defining wall which has a lower surface; a latch locking unit including a limiting rod that extends through the elongate groove and that is in sliding contact with the lower surface of the groove-defining wall; and a latch unit pivoted to the front end portion. The latch unit has a limiting arm unit extending toward the limiting rod, disposed above the limiting rod, and arrested by the limiting rod when moving downwardly.

8 Claims, 6 Drawing Sheets

SAFETY HOOK

CROSS-REFERENCE TO RELATED APPLICATION

This application claims priority of Taiwanese Application No. 095219434, filed on Nov. 3, 2006.

BACKGROUND OF THE INVENTION

1. Field of the Invention

The invention relates to a safety hook, more particularly to a safety hook including a hook body, a latch unit, and a limiting rod extending through a groove in the hook body for abutting against the hook body when the latch unit is undesirably moved from a locked position toward an unlocked position.

2. Description of the Related Art

FIG. 1 illustrates a conventional safety hook 10 that includes an inverted J-shaped hook body 11 that is formed with a hook mouth, a latch unit 12 for locking and unlocking the hook mouth, and a latch locking unit 13 for preventing undesired unlocking of the latch unit 12.

The hook body 11 includes a ring-shaped base segment 110, an arcuate arm segment 111 that extends upwardly from the base segment 110, and a hook end segment 112 that extends from the arcuate arm segment 110 and that cooperates with a front end portion of the base segment 10 to define the hook mouth of the hook body 11.

The latch locking unit 13 includes a generally U-shaped plate 130 pivoted to the hook body 11 so as to be rotatable relative to the hook body 11 about a first axis (A) between restrained and unrestrained positions, a limiting rod 132 that extends through and that is mounted on lateral wings of the U-shaped plate 130, and a first urging member 134. The first urging member 134 provides an urging force for the U-shaped plate 130 to bias the same in a direction about the first axis (A) as shown in the FIG. 1, until the limiting rod 132 abuts against and is thus stopped by the hook body 11.

The latch unit 12 includes a latch member 121 that is pivoted to the hook body 11 so as to be rotatable relative to the hook body 11 about a second axis (B) between locking and unlocking positions, and a second urging member 122. The latch member 121 has a latch arm 123 that engages the hook end segment 112 of the hook body 11 when the latch member 12 is disposed at the locking position, and that is disengaged from the hook end segment 112 of the hook body 11 when the latch member 121 is disposed at the unlocking position. The latch member 121 further has a limiting arm 124 that extends toward the limiting rod 132. The second urging member 122 provides an urging force for the latch member 121 to bias the same in a direction about the first axis (B) as shown in the FIG. 1, until the latch arm 123 abuts against and is thus stopped by the hook end segment 112. The limiting arm 124 has a free end that is disposed above the limiting rod 132 when the latch member 121 is disposed at the locking position and when the latch locking unit 13 is disposed at the restrained position, and that abuts against and is stopped by the limiting rod 132 when the latch member 121 starts moving from the locked position toward the unlocking position and when the latch locking unit 13 is disposed at the restrained position, thereby preventing rotation of the latch member 121 about the second axis (B).

When the safety hook 10 is to be unlocked, if only a pushing force (F) is exerted to move the latch member 121 toward the arcuate arm segment 111 as shown in FIG. 1, since the limiting arm 124 abuts against and is stopped by the limiting rod 132, pivoting operation of the latch arm 123 about the second axis (B) is blocked. Hence, to permit unlocking of the safety hook 10, a second pushing force (E) as shown in FIG. 1 must be exerted to move the U-shaped plate 130 against the urging force of the first urging member 134 to the unrestrained position such that the latch arm 123 is free to rotate about the second axis (B).

Nevertheless, in view of the structure of the safety hook 10, under the situation that when only the pushing force (F) is exerted, the pushing force (F) is transferred to the limiting rod 132 in a downward direction (D) as shown in FIG. 1, which, in turn, is transferred to the lateral wings of the U-shaped plate 130. Since the structure of the portions of the lateral wings of the U-shaped plate 130 on which the limiting rod 132 is mounted is weaker than other portions of the U-shaped plate 130, the structure of the portions of the lateral wings of the U-shaped plate 130 can break when only an undesired pushing force (F) is exerted on the latch arm 123.

SUMMARY OF THE INVENTION

Therefore, the object of the present invention is to provide a safety hook that can overcome the aforesaid drawback associated with the prior art.

Accordingly, a safety hook of this invention comprises: a hook body having a base segment that has front and rear end portions, an arcuate arm segment that extends upwardly from the base segment, and a hook end segment that extends from the arcuate arm segment and that cooperates with the front end portion of the base segment to define a hook mouth of the hook body, the rear end portion of the base segment being formed with an elongate groove that is defined by a groove-defining wall which has a lower surface; a latch locking unit pivoted to the hook body so as to be rotatable relative to the hook body about a first axis between restrained and unrestrained positions, the latch locking unit including a limiting rod that extends through the elongate groove in the rear end portion of the base segment, that is in sliding contact with the lower surface of the groove-defining wall, and that is parallel to the first axis; and a latch unit pivoted to the front end portion of the base segment so as to be rotatable relative to the hook body about a second axis between locked and unlocked positions, the second axis being parallel to the first axis, the latch unit having a latch arm that engages the hook end segment of the hook body when the latch unit is disposed at the locked position, and that is disengaged from the hook end segment of the hook body when the latch unit is disposed at the unlocked position, the latch unit further having a limiting arm that extends toward the limiting rod, the limiting arm having a free end that is disposed above the limiting rod when the latch unit is disposed at the locked position and when the latch locking unit is disposed at the restrained position, and that presses the limiting rod to abut against the lower surface of the groove-defining wall when the latch unit starts moving from the locked position toward the unlocked position and when the latch locking unit is disposed at the restrained position, thereby preventing rotation of the latch unit about the second axis.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
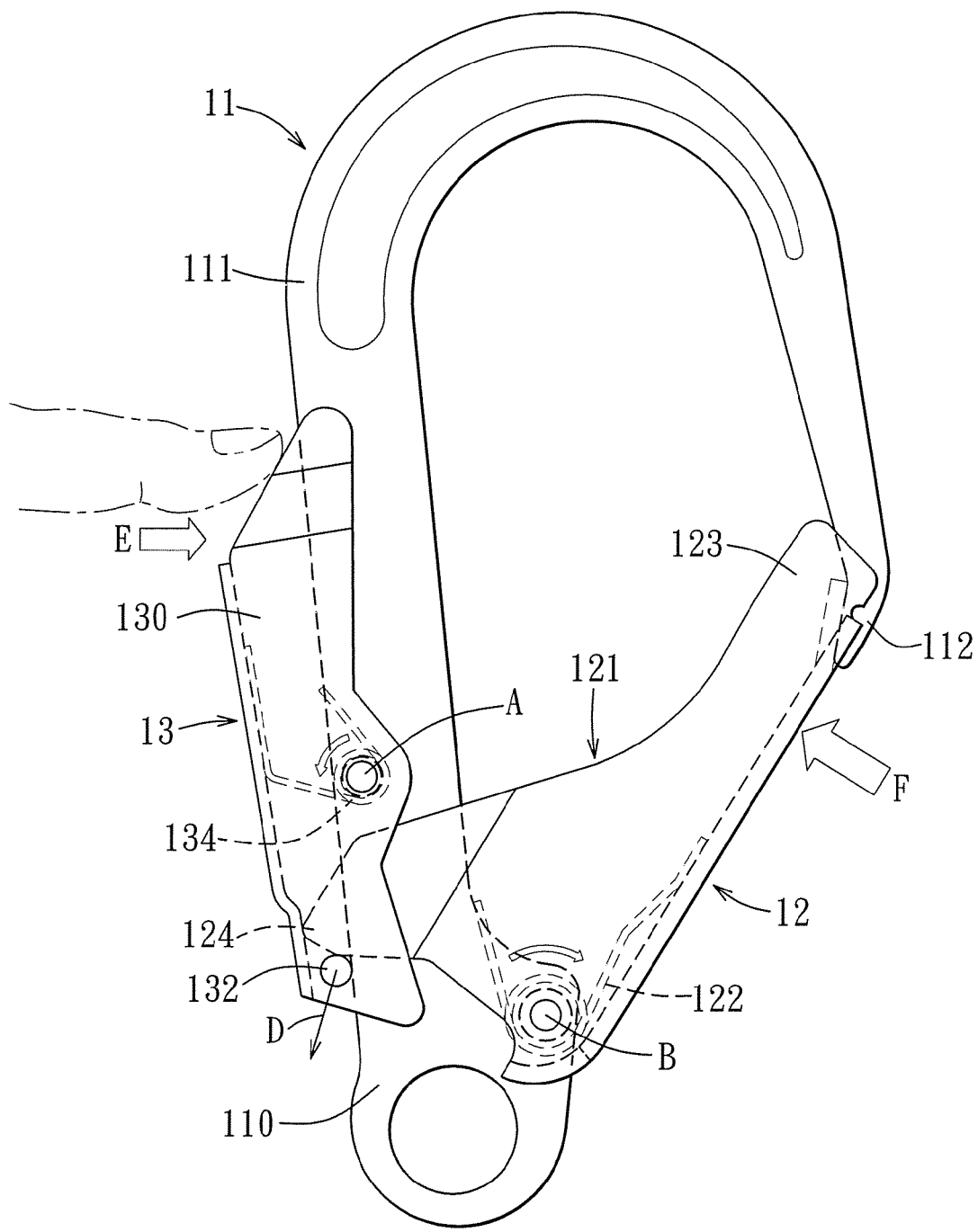
FIG. 1 is a perspective view of a conventional safety hook in a locked state.

Before the present invention is described in greater detail with reference to the accompanying preferred embodiments, it should be noted herein that like elements are denoted by the same reference numerals throughout the disclosure.

Figure 2:
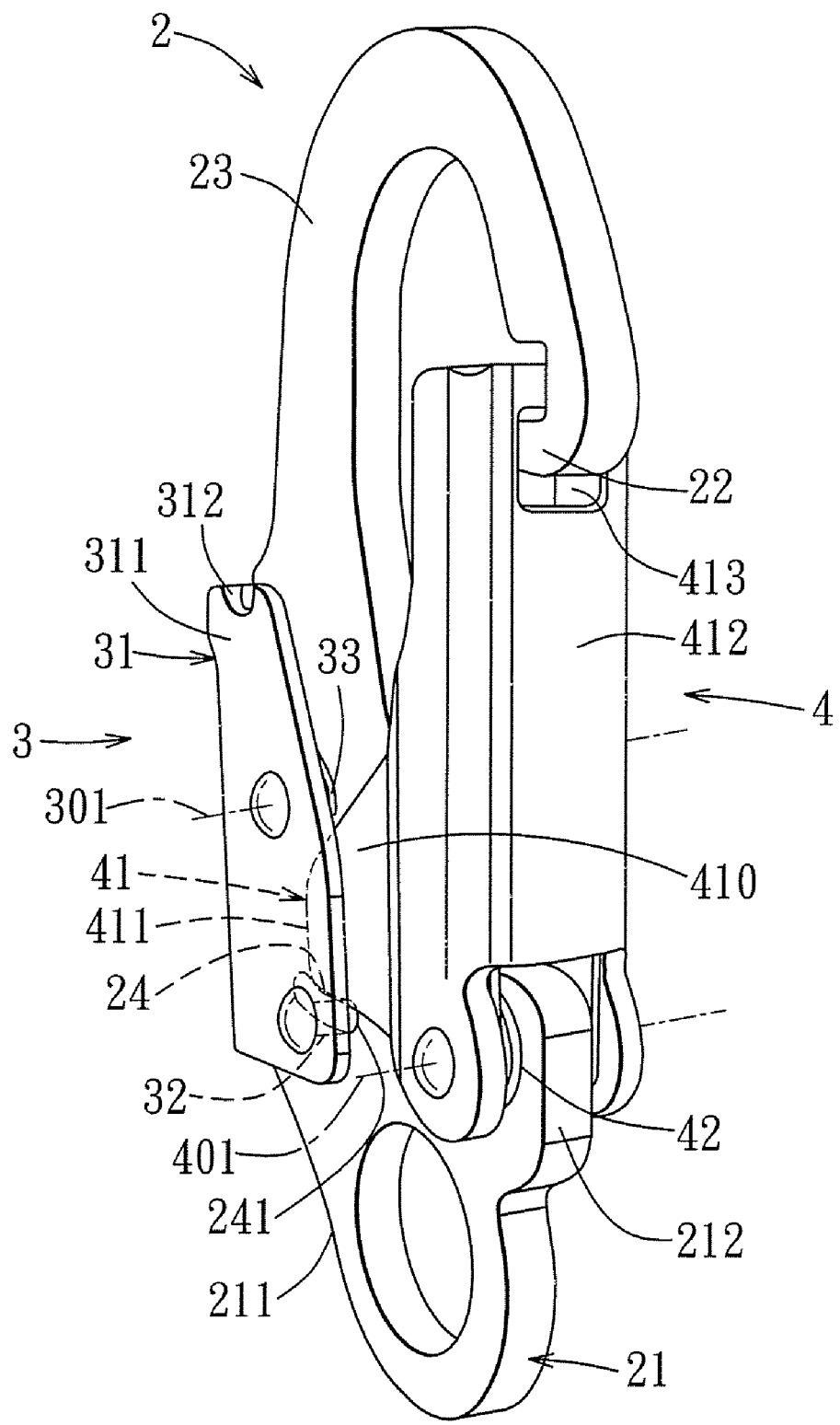
FIG. 2 is a perspective view of the first preferred embodiment of a safety hook according to the present invention in a locked and restrained state.
Figure 3:
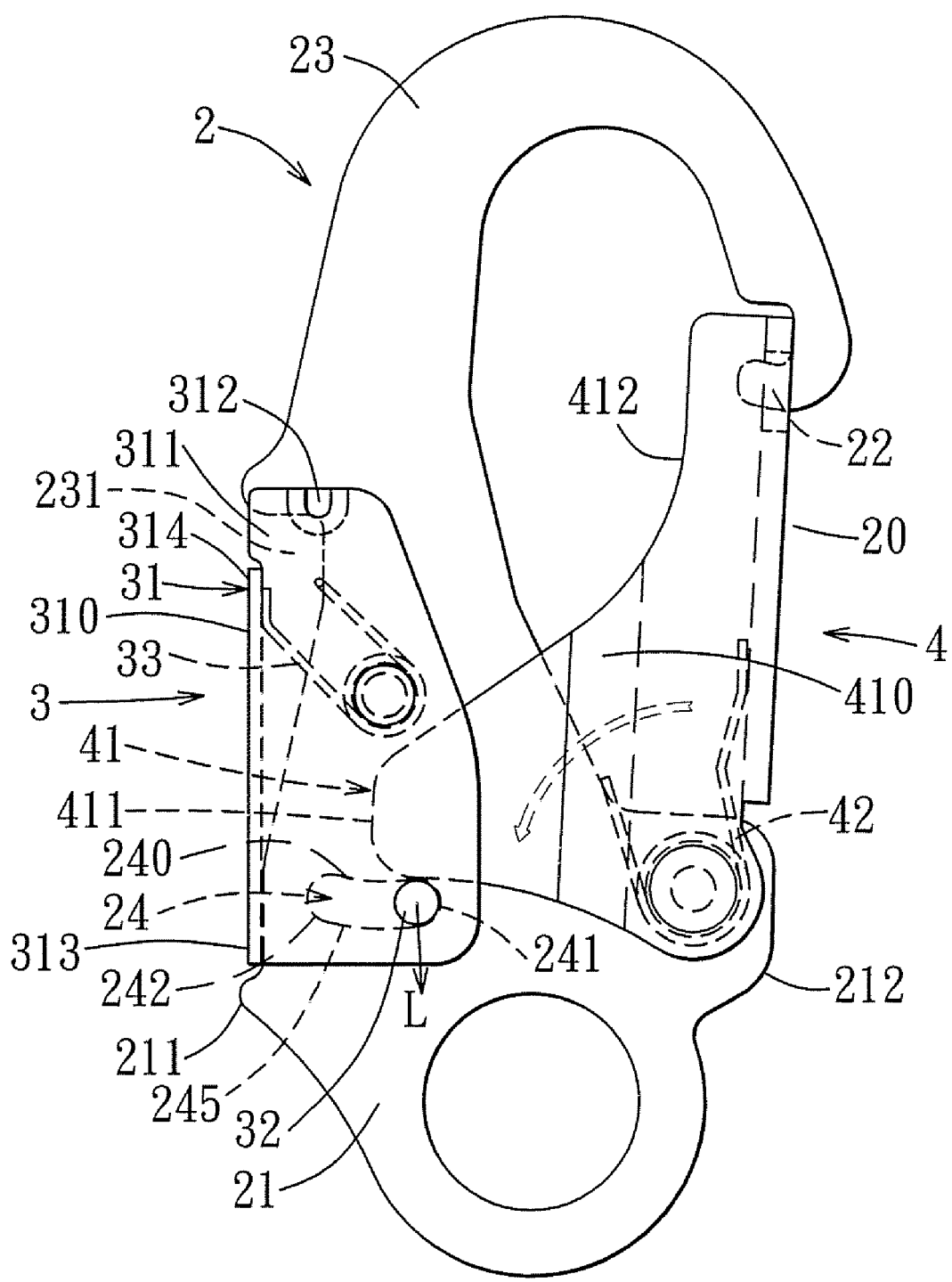
FIG. 3 is a schematic side view of FIG. 2.

Referring to FIGS. 2 and 3, the first preferred embodiment of a safety hook according to the present invention is shown to include: a hook body 2 having a ring-shaped base segment 21 that has front and rear end portions 212, 211, an arcuate arm segment 23 that extends upwardly from the base segment 21, and a hook end segment 22 that extends from the arcuate arm segment 23 and that cooperates with the front end portion 212 of the base segment 21 to define a hook mouth 20 of the hook body 2, the rear end portion 211 of the base segment 21 being formed with an elongate groove 24 that is defined by a groove-defining wall 240 which has a lower surface 245; a latch locking unit 3 pivoted to the hook body 2 so as to be rotatable relative to the hook body 2 about a first axis 301 between restrained and unrestrained positions (see FIGS. 3 and 4), the latch locking unit 3 including a limiting rod 32 that extends through the elongate groove 24 in the rear end portion 211 of the base segment 21, that is in sliding contact with the lower surface 245 of the groove-defining wall 240, and that is parallel to the first axis 301; and a latch unit 4 pivoted to the front end portion 212 of the base segment 21 so as to be rotatable relative to the hook body 2 about a second axis 401 between locked and unlocked positions (see FIGS. 3 and 4), the second axis 401 being parallel to the first axis 301, the latch unit 4 having a latch arm 412 that engages the hook end segment 22 of the hook body 2 when the latch unit 4 is disposed at the locked position (see FIG. 3), and that is disengaged from the hook end segment 22 of the hook body 2 when the latch unit 4 is disposed at the unlocked position (see FIG. 4), the latch unit 4 further having a limiting arm unit 41 that extends toward the limiting rod 32, the limiting arm unit 41 having a free end that is disposed above the limiting rod 32 when the latch unit 4 is disposed at the locked position and when the latch locking unit 3 is disposed at the restrained position, and that presses the limiting rod 32 to abut against the lower surface 245 of the groove-defining wall 240 when the latch unit 4 starts moving from the locked position toward the unlocked position and when the latch locking unit 3 is disposed at the restrained position, thereby preventing rotation of the latch unit 4 about the second axis 401.

Figure 4:
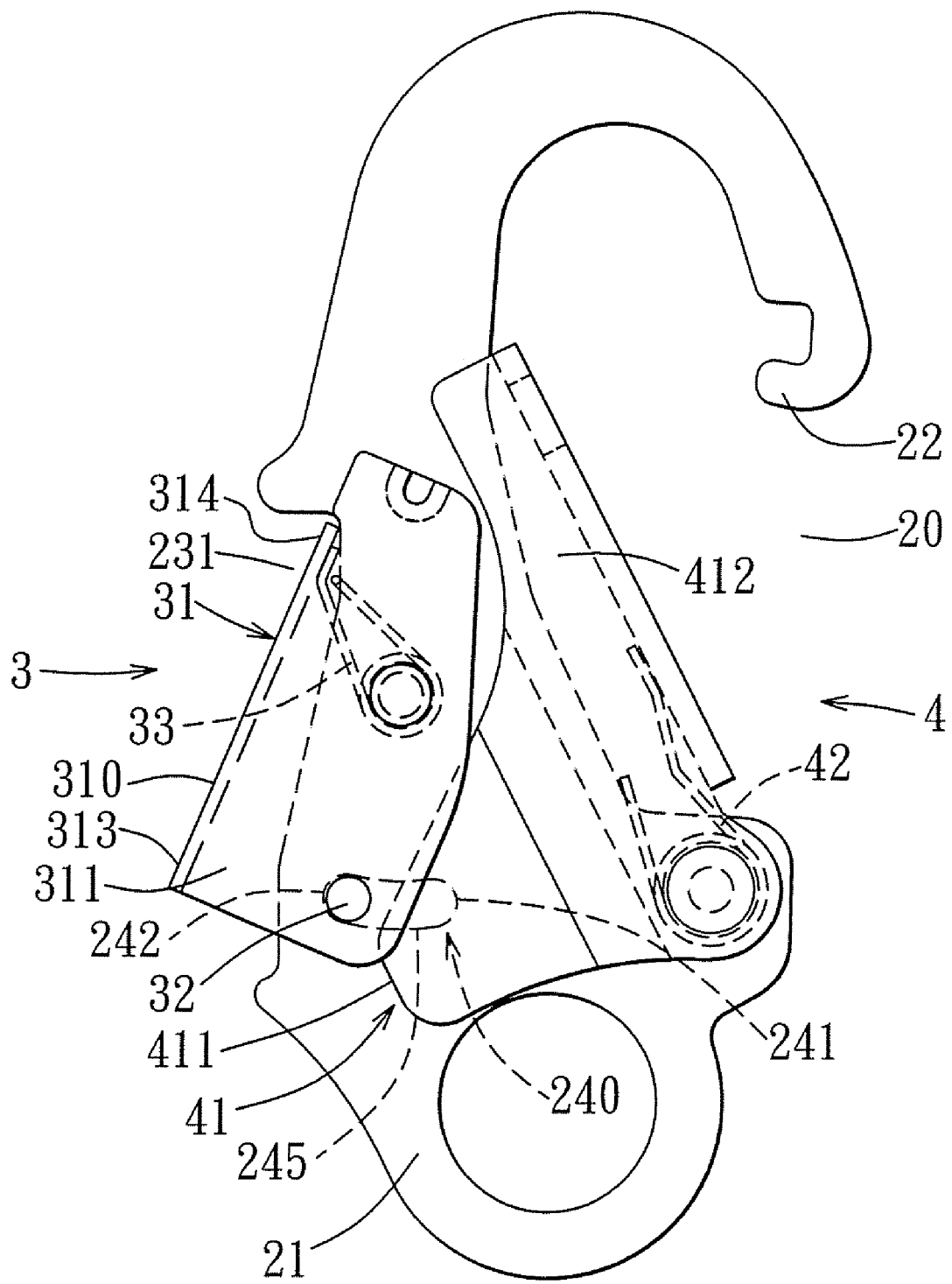
FIG. 4 is a schematic side view of the first preferred embodiment in an unlocked and unrestrained state.

Referring to FIG. 4, the latch locking unit 3 includes a generally U-shaped plate 31 that straddles the hook body 2 and that has a planar base portion 310. The base portion 310 has upper and lower ends 314, 313. The arcuate arm segment 23 is formed with an accommodating recess 231 (see FIG. 4). The lower end 313 of the base portion 310 abuts against the base segment 21 and the upper end 314 of the base portion 310 is disposed outwardly of the accommodating recess 231 when the latch locking unit 3 is disposed at the restrained position (see FIG. 3). The lower end 313 of the base portion 310 is distal from the base segment 21 and the upper end 314 of the base portion 310 is received in the accommodating recess 231 when the latch locking unit 3 is disposed at the unrestrained position (see FIG. 4).

In the first preferred embodiment, the elongate groove 24 is arcuate in shape and has front and rear closed ends 241, 242. The limiting rod 32 is moved to the front closed end 241 of the elongate groove 24 when the latch locking unit 3 is disposed at the restrained position, and is moved to the rear closed end 242 of the elongate groove 24 when the latch locking unit 3 is disposed at the unrestrained position.

The U-shaped plate 31 further has a pair of wing portions 311 connected to the base portion 310. Each of the wing portions 311 has a reinforced upper part 312 for enhancing the structural strength of the wing portions 311. The safety hook further includes a first axle extending through the wing portions 311 and the arcuate arm segment 23 so as to mount the latch locking unit 3 to the arcuate arm segment 23, and defines the first axis 301, and a first urging member 33 mounted on the first axle for restoring the latch locking unit 3 from the unrestrained position to the restrained position. The first urging member 33 has an urging end abutting against the base portion 310 of the U-shaped plate 31.

The latch arm 412 is generally U-shaped, is straddled on the front end portion 212 of the base segment 12, and has an upper end formed with an engaging hole 413 engageable with the hook end segment 22, and a pair of wing parts 410. The limiting arm unit 41 has a pair of limiting arms 411 extending respectively from the wing parts 410 toward the limiting rod 32. The safety hook further includes a second axle extending through the wing parts 410 and the front end portion 212 of the base segment 21 so as to mount the latch unit 4 to the base segment 21, and defining the second axis 401, and a second urging member 42 mounted on the second axle for restoring the latch unit 4 from the unlocked position to the locked position. The second urging member 42 has an urging end abutting against the latch arm 412.

When only a pushing force is exerted on the latch unit 4 against the urging force of the second urging member 42 toward the arcuate arm segment 23, since the limiting arm unit 411 abuts against and is stopped by the limiting rod 32, pivoting operation of the latch arm 412 about the second axis 401 is blocked.

To permit unlocking of the latch unit 4, a second force must be exerted on the U-shaped plate 31 against the urging force of the first urging member 33 so as to move the latch locking unit 3 to the unrestrained position such that the latch arm 412 is free to rotate about the second axis 401.

When an undesired pushing force is exerted on the latch arm 412 against the urging force of the second urging member 42 and when the latch locking unit 3 is disposed at the restrained position, the pushing force is transferred to the limiting rod 32 in a downward direction (L) (see FIG. 3), which, in turn, is transferred to the base segment 21 of the hook body 2. Since the structure of the base segment 21 of the hook body 2 is relatively strong, the aforesaid drawback associated with the prior art can be eliminated.

Figure 5:
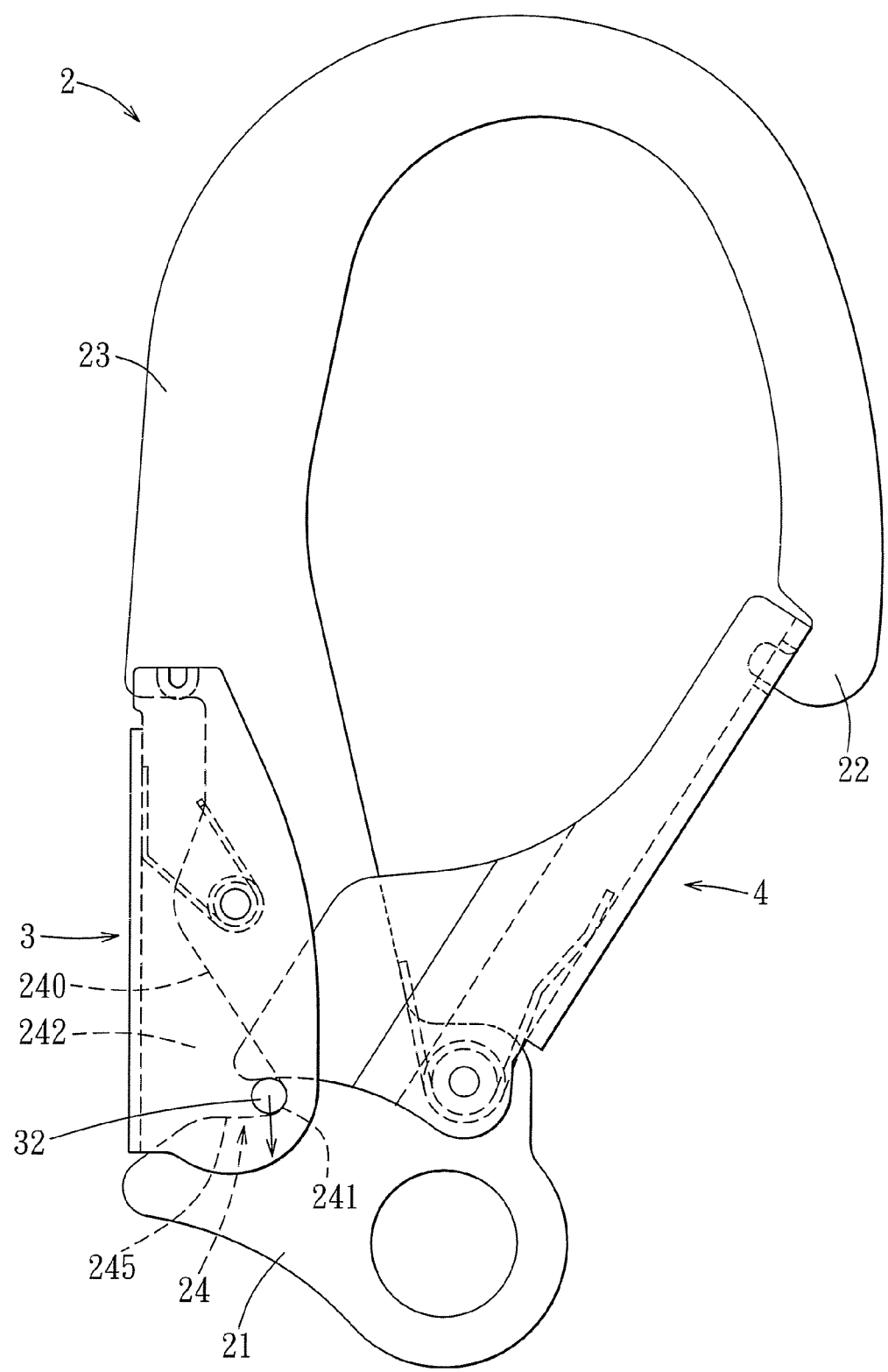
FIG. 5 is schematic side view of the second preferred embodiment of a safety hook according to the present invention in a locked and restrained state.
Figure 6:
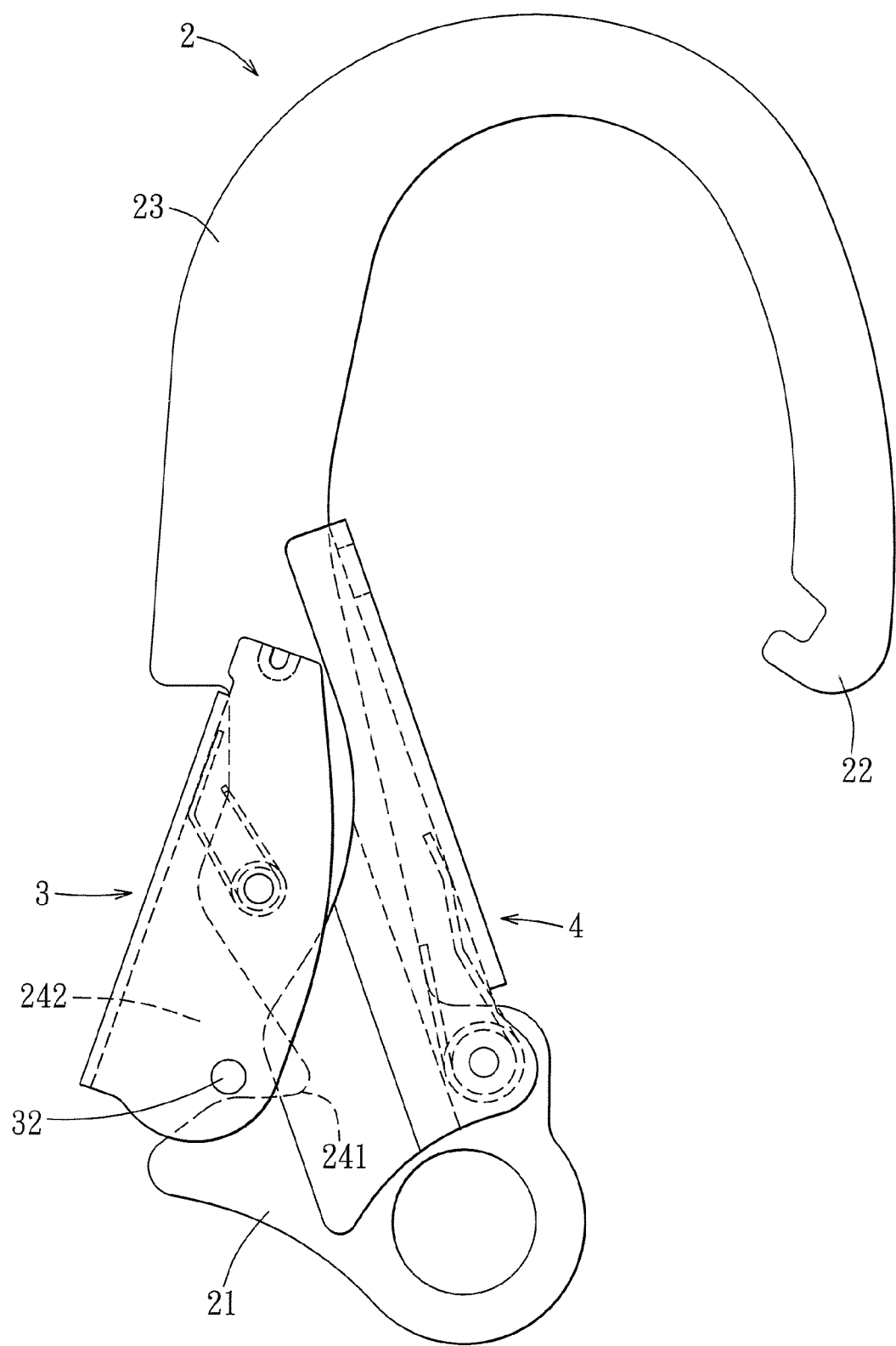
FIG. 6 is a schematic side view of the second preferred embodiment in an unlocked and unrestrained state.

As shown in FIGS. 5 and 6, the second preferred embodiment of the safety hook according to this invention differs from the previous embodiment in that the elongate groove 24 has a closed end 241 and an open end 242 opposite to the closed end 241 and opening rearwardly. The groove-defining wall 240 diverges from the closed end 241 toward the open end 242. The limiting rod 32 is moved to the closed end 241 of the elongate groove 24 when the latch locking unit 3 is disposed at the restrained position (see FIG. 5), and is moved to the open end 242 of the elongate groove 24 when the latch locking unit is disposed at the unrestrained position (see FIG. 6).

By forming the elongate groove 24 in the base segment 21 of the hook body 2 of the safety hook of this invention and by extending the limiting rod 32 into the elongate groove 24, the aforesaid drawback associated with the prior art can be eliminated.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A safety hook comprising:
   a hook body having a base segment that has front and rear end portions, an arcuate arm segment that extends upwardly from said base segment, and a hook end segment that extends from said arcuate arm segment and that cooperates with said front end portion of said base segment to define a hook mouth of said hook body, said rear end portion of said base segment being formed with an elongate groove that is defined by a groove-defining wall which has a lower surface;
   a latch locking unit pivoted to said hook body so as to be rotatable relative to said hook body about a first axis between restrained and unrestrained positions, said latch locking unit including a limiting rod that extends through said elongate groove in said rear end portion of said base segment, that is in sliding contact with said lower surface of said groove-defining wall, and that is parallel to said first axis; and
   a latch unit pivoted to said front end portion of said base segment so as to be rotatable relative to said hook body about a second axis between locked and unlocked positions, said second axis being parallel to said first axis, said latch unit having a latch arm that engages said hook end segment of said hook body when said latch unit is disposed at the locked position, and that is disengaged from said hook end segment of said hook body when said latch unit is disposed at the unlocked position, said latch unit further having a limiting arm unit that extends toward said limiting rod, said limiting arm unit having a free end that is disposed above said limiting rod when said latch unit is disposed at the locked position and when said latch locking unit is disposed at the restrained position, and that presses said limiting rod to abut against said lower surface of said groove-defining wall when said latch unit starts moving from the locked position toward the unlocked position and when said latch locking unit is disposed at the restrained position, thereby preventing rotation of said latch unit about said second axis,
   wherein said elongate groove is arcuate in shape and has front and rear closed ends, said limiting rod being moved to said front closed end when said latch locking unit is disposed at the restrained position, and being moved to said rear closed end when said latch locking unit is disposed at the unrestrained position.

2. The safety hook as claimed in claim 1, wherein said latch locking unit includes a generally U-shaped plate that straddles said hook body and that has a planar base portion, said base portion having upper and lower ends, said arcuate arm segment being formed with an accommodating recess, said lower end of said base portion abutting against said base segment and said upper end of said base portion being disposed outwardly of said accommodating recess when said latch locking unit is disposed at the restrained position, said lower end of said base portion being distal from said base segment and said upper end of said base portion being received in said accommodating recess when said latch locking unit is disposed at the unrestrained position.

3. The safety hook as claimed in claim 1, further comprising an urging member mounted on said arcuate arm segment for restoring said latch locking unit from the unrestrained position to the restrained position.

4. The safety hook as claimed in claim 1, further comprising an urging member mounted on said front end portion of said base segment for restoring said latch unit from the unlocked position to the locked position.

5. A safety hook comprising:
   a hook body having a base segment that has front and rear end portions, an arcuate arm segment that extends upwardly from said base segment, and a hook end segment that extends from said arcuate arm segment and that cooperates with said front end portion of said base segment to define a hook mouth of said hook body, said rear end portion of said base segment being formed with an elongate groove that is defined by a groove-defining wall which has a lower surface;
   a latch locking unit pivoted to said hook body so as to be rotatable relative to said hook body about a first axis between restrained and unrestrained positions, said latch locking unit including a limiting rod that extends through said elongate groove in said rear end portion of said base segment, that is in sliding contact with said lower surface of said groove-defining wall, and that is parallel to said first axis; and
   a latch unit pivoted to said front end portion of said base segment so as to be rotatable relative to said hook body about a second axis between locked and unlocked positions, said second axis being parallel to said first axis, said latch unit having a latch arm that engages said hook end segment of said hook body when said latch unit is disposed at the locked position, and that is disengaged from said hook end segment of said hook body when said latch unit is disposed at the unlocked position, said latch unit further having a limiting arm unit that extends toward said limiting rod, said limiting arm unit having a free end that is disposed above said limiting rod when said latch unit is disposed at the locked position and when said latch locking unit is disposed at the restrained position, and that presses said limiting rod to abut against said lower surface of said groove-defining wall when said latch unit starts moving from the locked position toward the unlocked position and when said latch locking unit is disposed at the restrained position, thereby preventing rotation of said latch unit about said second axis;
   wherein said elongate groove has a closed end and an open end opposite to said closed end and opening rearwardly, said groove-defining wall diverging from said closed end toward said open end, said limiting rod being moved to said closed end when said latch locking unit is disposed at the restrained position.

6. The safety hook as claimed in claim 5, wherein said latch locking unit includes a generally U-shaped plate that straddles said hook body and that has a planar base portion, said base portion having upper and lower ends, said arcuate arm segment being formed with an accommodating recess, said lower end of said base portion abutting against said base segment and said upper end of said base portion being disposed outwardly of said accommodating recess when said latch locking unit is disposed at the restrained position, said lower end of said base portion being distal from said base segment and said upper end of said base portion being received in said accommodating recess when said latch locking unit is disposed at the unrestrained position.

7. The safety hook as claimed in claim 5, further comprising an urging member mounted on said arcuate arm segment for restoring said latch locking unit from the unrestrained position to the restrained position.

8. The safety hook as claimed in claim 5, further comprising an urging member mounted on said front end portion of said base segment for restoring said latch unit from the unlocked position to the locked position.

* * * * *